US007856548B1

(12) United States Patent
Nelson et al.

(10) Patent No.: US 7,856,548 B1
(45) Date of Patent: Dec. 21, 2010

(54) PREDICTION OF DATA VALUES READ FROM MEMORY BY A MICROPROCESSOR USING A DYNAMIC CONFIDENCE THRESHOLD

(75) Inventors: Chris Nelson, Santa Clara, CA (US); Matthew Ashcraft, Belmont, CA (US); John Gregory Favor, Scotts Valley, CA (US)

(73) Assignee: Oracle America, Inc., Redwood City, CA (US)

( * ) Notice: Subject to any disclaimer, the term of this patent is extended or adjusted under 35 U.S.C. 154(b) by 142 days.

(21) Appl. No.: 11/645,901

(22) Filed: Dec. 26, 2006

(51) Int. Cl.
*G06F 9/00* (2006.01)
(52) U.S. Cl. ........................ 712/225; 712/220
(58) Field of Classification Search .................. 712/220, 712/219, 225
See application file for complete search history.

(56) References Cited

U.S. PATENT DOCUMENTS

| 5,898,852 | A * | 4/1999 | Petolino et al. ............. 712/214 |
| 5,903,768 | A * | 5/1999 | Sato .............................. 712/1 |
| 6,438,673 | B1 * | 8/2002 | Jourdan et al. .............. 711/213 |
| 6,487,639 | B1 * | 11/2002 | Lipasti ........................ 711/137 |
| 6,820,173 | B1 * | 11/2004 | Bittel et al. ................. 711/137 |
| 6,986,027 | B2 * | 1/2006 | Barowski et al. ............ 712/240 |
| 7,188,234 | B2 * | 3/2007 | Wu et al. ..................... 712/225 |
| 7,222,227 | B2 * | 5/2007 | Katayama et al. ........... 712/239 |
| 7,243,218 | B2 * | 7/2007 | Winberg et al. .............. 712/239 |
| 2002/0023204 | A1 * | 2/2002 | Barowski et al. ............ 712/239 |
| 2003/0110366 | A1 * | 6/2003 | Wu et al. ..................... 712/225 |
| 2003/0172255 | A1 * | 9/2003 | Dundas ....................... 712/225 |
| 2004/0078559 | A1 * | 4/2004 | Katayama et al. ........... 712/239 |
| 2007/0006195 | A1 * | 1/2007 | Braun et al. ................. 717/151 |
| 2007/0074006 | A1 * | 3/2007 | Martinez et al. ............. 712/218 |
| 2007/0226470 | A1 * | 9/2007 | Krimer et al. ................ 712/225 |

OTHER PUBLICATIONS

Brad Calder and Glenn Reinman, A Comparative Survey of Load Speculation Architectures , Journal of Instruction Level Parallelism, May 2000.*
Brad Calder, Glenn Reinman, and Dean Tullsen, Selective Value Prediction , 26th International Symposium on Computer Architecture, pp. 64-73, May 1999.*
Lipasti, Mikko, et al. "Value Locality and Load Value Prediction," Carnegie Mellon University, Preprint of paper to appear in ASPLOS-VII, Oct. 1996, 10 pages.
Burtscher, Martin, et al., "Exploring Last n Value Prediction," 11 pages, Oct. 1999.
Lepak, Kevin M., et al., "On the Value Locality of Store Instructions," University of Wisconsin, Madison, Jun. 13, 2000, 31 pages.

(Continued)

*Primary Examiner*—Eddie P Chan
*Assistant Examiner*—Idriss N Alrobaye
(74) *Attorney, Agent, or Firm*—Osha • Liang LLP

(57) ABSTRACT

Prediction of data values to be read from memory by a microprocessor for load operations. In one aspect, a method for predicting a data value that will result from a load operation to be executed by the microprocessor includes accessing an entry in a load value prediction table that stores a predicted data value corresponding to the load operation. The predicted data value is provided as a result of the load operation without waiting for execution of the load operation to complete based on a confidence parameter stored in the entry compared to a dynamic confidence threshold.

28 Claims, 3 Drawing Sheets

OTHER PUBLICATIONS

Burtscher, Martin, et al., "Prediction Outcome History-based Confidence Estimation for Load Value Prediction," Department of Computer Science, University of Colorado., Journal of Instruction-Level Parallelism 1, published May 1999, p. 1-25.

Burtscher, Martin, et al., "Hybrid Load Value Predictors," pp. 1-35, Aug. 7, 2002.

Llena, Enric Morancho, "Address Prediction and Recovery Mechanisms," Department d'Arquitectura de Computadors, Universitat Politencnica de Catalunya Barcelona (Spain), May 2002, 216 pages.

* cited by examiner

PREDICTION OF DATA VALUES READ FROM MEMORY BY A MICROPROCESSOR USING A DYNAMIC CONFIDENCE THRESHOLD

CROSS-REFERENCE TO RELATED APPLICATIONS

This application is related to co-pending U.S. Patent Application filed on even-date herewith, bearing Ser. No. 11/645,935 entitled "Prediction Of Data Values Read From Memory By A Microprocessor Using Selective Table Entry Replacement", co-pending, U.S. Patent Application filed on even date herewith, bearing Ser. No. 11/646,008, entitled "Predication Of Data Values Read From Memory By A Microprocessor Using The Storage Destination Of A Load Operation" and co-pending U.S. Patent Application filed on even-date herewith, bearing Ser. No. 11/645,917, entitled Prediction Of Data Values Read From Memory By A Microprocessor", all of which are incorporated herein by reference.

FIELD OF THE INVENTION

The present invention relates to microprocessors and more particularly to reading data values from memory by microprocessors.

BACKGROUND OF THE INVENTION

Microprocessors are used extensively in computer and electronic devices to process instructions and data values. A basic operation for microprocessors is to read data values from memory for use during processing, also known as load operations, which can be based on received load instructions. A microprocessor reads instructions and values from memory locations specified as addresses in the load instructions, and the loaded data values can be used in the execution of subsequent instructions. The use of parallel processing techniques, such as instruction pipelining, allows microprocessor performance to increase by executing more than one instruction at a time. For example, the initial steps of instruction fetching and decoding of a subsequent instruction can be started before the prior instruction finishes executing.

One of the limits to performance of central processing units (CPUs) in microprocessors is stalls caused when data retrieved by a load operation is also needed by one or more pipelined subsequent instructions before the load operation has completed. This causes a time delay while such dependent subsequent instruction(s) wait for the load operation to complete. Even when using fast local caches in the microprocessor, the load-to-use penalty will typically be non-zero. In a superscalar design, this penalty is even higher if multiple instructions are stalled, waiting for the single result of a load instruction.

Some approaches have been tried to reduce this penalty in processing time due to pending load instructions. For example, one approach attempts to predict the address in memory at which a future decoded load operation will read a value, and execute the load operation speculatively, at the predicted address, before the actual load address is known. This pre-loading of data values can potentially save time when the values are actually needed by dependent instructions. However, such address prediction requires the load operation to be completely executed before the speculated data is obtained and available for subsequent operations, which can still introduce a significant delay in the processing of subsequent instructions waiting on the load operation result. In other approaches, the load value is predicted based on stored load values retrieved during previous load operations. However, these techniques can often provide inaccurate predicted data values and consume significant system resources, greatly reducing the benefits of the prediction system.

Accordingly, what is needed is a method and system that provides data values for load operations to be available to dependent operations before execution of the load operations, and which can provide more accurate predicted load values using less system resources.

SUMMARY OF THE INVENTION

The invention of the present application relates to prediction of data values to be read from memory by a microprocessor for load operations, to reduce stalls in the microprocessor. In one aspect of the invention, a method for predicting a data value that will result from a load operation to be executed by the microprocessor includes accessing an entry in a load value prediction table that stores a predicted data value corresponding to the load operation, and providing the predicted data value as a result of the load operation without waiting for execution of the load operation to complete based on a confidence parameter stored in the entry compared to a dynamic confidence threshold. Different aspects provide a computer readable medium and a microprocessor with similar features.

In another aspect of the invention, a microprocessor is operative to predict a data value that will result from a load operation to be executed by the microprocessor. The microprocessor includes a mechanism operative to access an entry in a load value prediction table and select a predicted data value corresponding to the load operation and stored in the entry, where the selection is based on a confidence parameter stored in the entry compared to a dynamic confidence threshold. Also included is a mechanism operative to provide the selected predicted data value as a result of the load operation without waiting for execution of the load operation to complete.

The present invention provides a method and system allowing prediction of data values that are retrieved using load operations such that speculative data values are available as soon as the prediction is completed. This allows speculative execution of dependent operations to issue, leading to significant reductions in stalls in microprocessor operation. The present invention includes a dynamic confidence threshold that can be adjusted to improve the prediction capability based on the previous performance of the system, and provides other features for prediction accuracy and reduced resource consumption, thereby increasing the performance of the system.

DETAILED DESCRIPTION

The present invention relates to microprocessors, and more particularly to reading data values from memory by microprocessors. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1-3 in conjunction with the discussion below.

Figure 1:
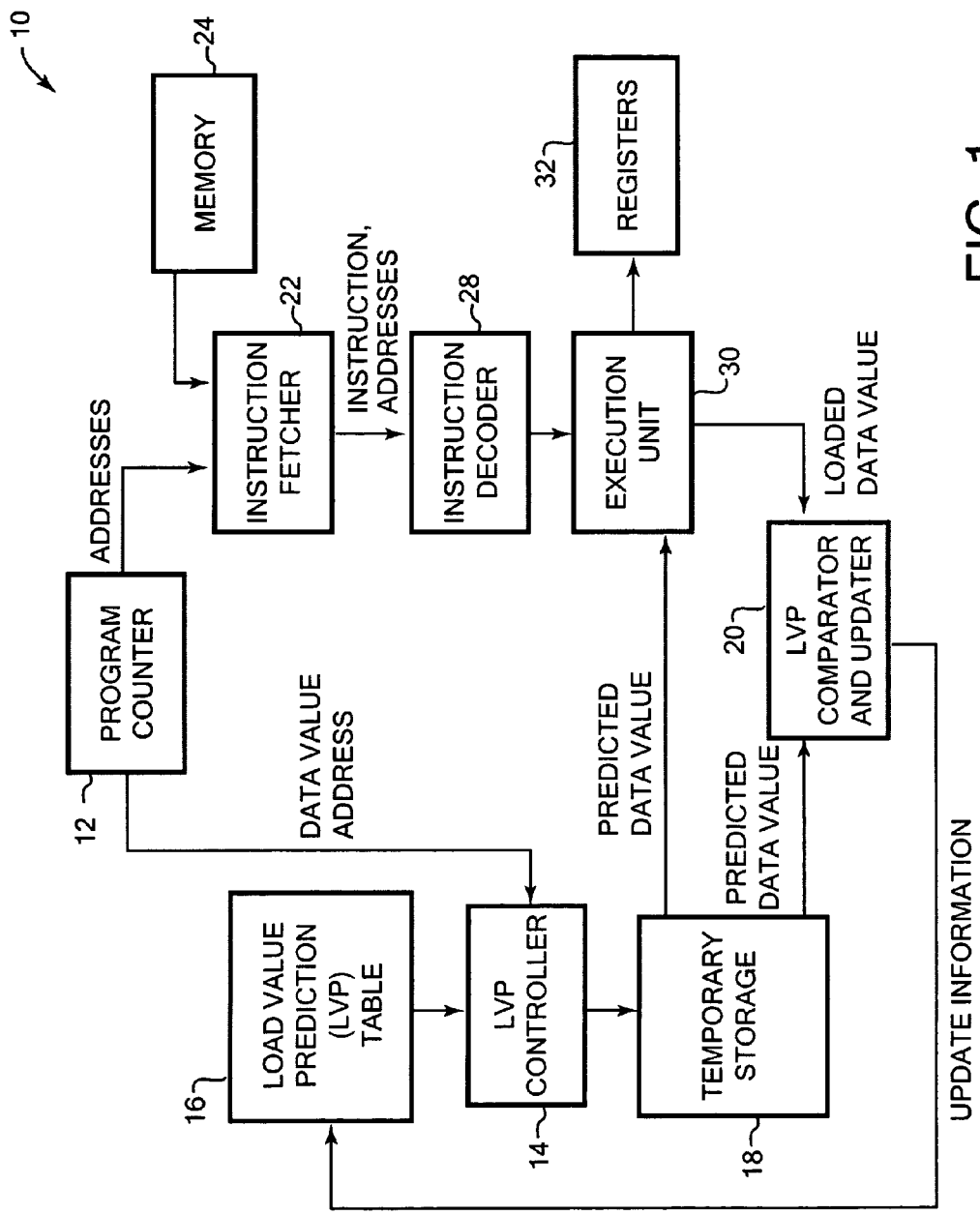
FIG. 1 is a block diagram illustrating a microprocessor architecture including the load value prediction features of the present invention.

FIG. 1 is a block diagram illustrating a microprocessor architecture 10 including components of the present invention for predicting data values to be read from memory by the microprocessor. As used herein, the term "memory" or "storage" generally refer to any kind of storage for data, including main memory or other memory provided in Random Access Memory (RAM), Read-Only Memory (ROM), Flash memory, and other types, and also including cache memory, registers, or other types.

The microprocessor 10 is typically included in a computer system or other electronic device. For example, the microprocessor can be in a mainframe computer, desktop computer, workstation, portable computer, or electronic device. The microprocessor can interface with memory devices and other components to control the operation of the device, including performing data manipulation, computation, input/output, and other typical functions.

Microprocessor or central processing unit (CPU) architecture 10 includes a program counter 12 that is typically implemented in one or more registers of the microprocessor, or other memory. Program counter 12 stores the address in memory of the next instruction to be executed (and in some embodiments the instruction currently being executed). The address can be a virtual or a physical address. In some cases, the program counter can be incremented automatically to retrieve instructions stored sequentially in memory, unless branch instructions cause a different value to be stored in the program counter. The address in the program counter 12 is accessed by multiple components of the architecture 10.

A load value prediction (LVP) controller of the present invention can include an LVP predictor 14, which receives from the program counter 12 the address for an instruction including a load operation that is to be executed (e.g., the load operation can currently be executed in parallel). LVP predictor 14 is preferably implemented in hardware of the microprocessor, or alternatively can be implemented partially or completely in software. The LVP predictor 14 uses the received instruction address to access the load value prediction (LVP) table 16 of the present invention to find a matching entry. The LVP table 16 can be implemented in fast memory so that an access of the table can be performed very quickly. The table 16 includes multiple entries that have been stored over time as load operations have been executed. These entries each include a predicted data value for a load operation corresponding to the entry, as well as other information. The LVP table 16 is described in greater detail below with respect to FIG. 2B. Herein, a "load operation" or "load" can refer to any load operation that retrieves a data value from memory, including a load associated with a "static" instruction in instruction memory, as well as a "dynamic" instance of a load operation, which may be invoked multiple times during the execution of a program.

If a matching entry is found in the LVP table 16 for a load operation (i.e. a hit in the table occurs), the LVP predictor 14 retrieves a predicted data value for that load operation from the matching entry of the table 16 and stores it in temporary storage 18 (any control information for information updates in the table 16 can also be stored in storage 18). Temporary storage 18 can be implemented as any suitable memory of the system; for example, it can be pipeline registers which can be accessed by the execution unit 30, or the register file of the microprocessor (for example, register renaming can be used), or any combination of suitable memory types. The predicted data value retrieved from the table 16 is provided to the LVP comparator and updater 20 of the present invention, which can be considered part of the LVP controller that also includes the LVP predictor 14. The comparator 20 performs a comparison between the predicted data value and the actual loaded data value, as described in greater detail below. The comparator and updater 20 can be implemented in different ways in different embodiments; for example, the comparator and updater functions can be implemented in the same logic block, or in separate logic blocks.

In some embodiments, the LVP controller components (such as predictor 14 and/or comparator 20) can also be shared with other operations or functions of the microprocessor that can make use of some or all of its functions. For example, silent stores may be implemented in a particular microprocessor embodiment, which is a memory write that does not change the system state. In silent store operation, a comparison is made between a (cacheable) value to be stored in a store operation and the value already stored in a memory location; if these values are the same, the store operation is not performed. Those comparisons used in silent stores that are compatible with the comparisons used in the load value prediction described herein can be performed using the same comparator 20.

Some components of the architecture 10 are standard microprocessor components; only particular microprocessor/CPU components relevant to the present invention are shown. An instruction fetcher 22 receives from the program counter 12 the address of the next instruction to be executed. The instruction fetcher 22 fetches the instruction at the received address from memory, such as memory 24 (main RAM, etc.), and provides it to an instruction decoder 28 (e.g., via storage in an instruction register). The instruction decoder 28 receives the fetched instruction and decodes it so that it may be executed as one or more executable operations. For example, the decoder 28 can break up the instruction into one or more operations, where an operation can include an opcode indicating which operation to perform, and operands providing information required for the operation.

One or more execution units 30 receive a decoded operation from the instruction decoder 28. The execution unit 30 represents the components of the microprocessor for executing an operation, such as components for reading values or flags from registers or setting values or flags in registers, adjusting the program counter (e.g., for jump instructions), an arithmetic logic unit (ALU) for performing mathematical operations, etc. In one example of a load operation, the load operation has one or more source registers. When values are available for each of those source registers, the execution unit 30 combines (e.g., adds) the source values to calculate the data memory address (in memory 24 or other suitable memory) from which to load the actual stored data value. The load operation also has a destination register into which the execution unit normally loads the data value. This loaded data value is committed as the result of the load operation by storing it in the destination register 32 (or other suitable memory). The committed data value is then made available for other operations or components of the system; e.g., the loaded value can be quickly accessed for use by one or more subsequent operations to the load operation. FIG. 1 shows memory 24 as a generic memory storage used for both storing instructions and data value storage and retrieval; in particular embodiments, data memory can be the same or separate from instruction memory, depending on the architecture.

However, this load operation takes some time to complete, and this may stall one or more subsequent operations to the load operation that are dependent on the retrieved data value. Using the present invention, the execution unit 30 can provide a committed data value to register 32 at an earlier time, without waiting for the execution of the load operation to complete, by retrieving a predicted data value that was stored in temporary storage 18 by LVP predictor 14 for this load operation. The LVP predictor can provide a signal or indication on a line or bus to the execution unit 30 that a predicted data value is available for the current load operation, and the execution unit 30 can retrieve the predicted value from temporary storage 18 at an address indicated by the LVP predictor when a subsequent operation requires it (or alternatively the LVP predictor can provide the predicted value to the execution unit 30). The execution unit 30 commits the predicted data value to the register 32 as the result of the load operation. In some embodiments, the temporary storage 18 that stores the predicted data value can be the register file, and/or the temporary storage 18 can be the register 32 in which an actual loaded data value is typically committed without prediction.

Even if the execution unit 30 receives a predicted data value as a result for the load operation, the execution unit will still complete the execution of the load operation to retrieve the actual data value from memory 24. This loaded data value is sent to the LVP comparator and updater 20. In some embodiments, the execution unit can also commit the actual loaded data value to the same register 32. For example, some implementations may find it useful to roll back speculative execution (after a misprediction) to just after the load operation completed, and use the corrected/actual data value, rather than rolling back to a point prior to the load operation. This embodiment also has the advantage of being able to store the predicted data value in the same physical register 32 (or other physical storage destination) that the actual loaded data value will be stored in, providing several advantages including allowing dependent operations to access the same register whether the data value is predicted or actual, reduced storage requirements, and the ability to use the existing circuitry of the register to provide the predicted data value to comparator 20.

The LVP comparator/updater 20 retrieves a predicted data value and any control information from temporary storage 18, and receives the loaded data value from the execution unit 30. The comparator portion of LVP block 20 compares the predicted data value with the loaded data value to determine if there has been a misprediction. The updater portion of LVP block 20 performs any modifications to the contents of the LVP table 16, such as replacing data values, updating control information, or replacing entire entries of the table 16. For example, a predicted data value is replaced with a loaded data value if the compared data values do not match and thus a misprediction was made, or an entire entry is replaced if a miss was found upon lookup in the table 16 and other conditions are met. In both cases control information in the appropriate table entry are typically updated. A roll back of dependent operations may also be required if there has been a misprediction. These operations are described in greater detail below with respect to FIG. 3.

The program counter 12 is incremented to address the next sequential instruction in memory, or is updated to a different address where the next instruction is to be fetched. For the present invention to be most useful, the processor should be pipelined, i.e., the program counter is incremented for following instructions before the load operation has an opportunity to execute.

In more complex microprocessors than the one described above, multiple instructions can be fetched, decoded, and executed simultaneously. Such microprocessors can also be used with the load value prediction features of the present invention, by including, for example, multiple pathways to the LVP table 16, multiple LVP predictors 14 and comparator/updaters 20, etc. In some embodiments, the LVP table 16 itself can be replicated into one or more additional tables. In such an embodiment, each individual load can be consistently assigned to the same execution pipeline having its own LVP table 16. A shared LVP table can be used if a load may be assigned to any pipeline without a high degree of consistency.

Figures 2A, 2B:
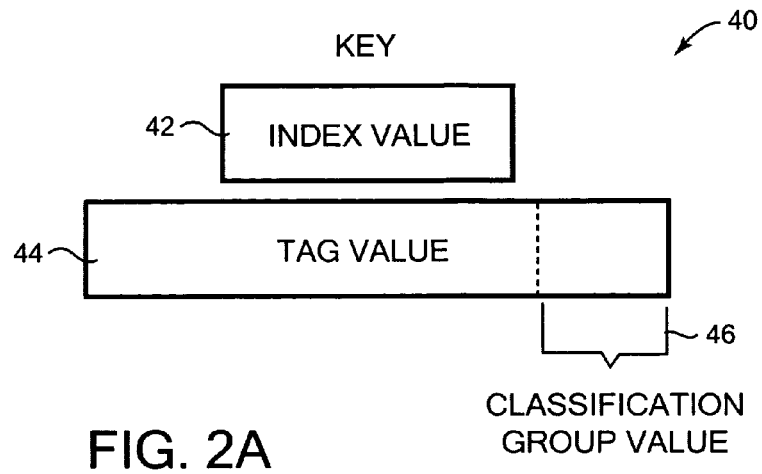
FIG. 2A is a diagrammatic illustration of an example of a suitable key created from a an address referring to a load operation.
FIG. 2B is a diagrammatic illustration of an example of a load value prediction table of the present invention.

FIG. 2A shows one example of a suitable predicted value key 40 created for a load operation based on the address retrieved from the program counter 12 (where the address from the program counter refers to an instruction that triggers the load operation). Key 40 is used to access the LVP table 16 as a load value cache to determine if the current load operation has a predicted data value stored in the cache.

In one embodiment, the key 40 is formed by hashing the program counter address using a well-known hashing algorithm, to create a key that has less bits (and storage requirements, etc.) than the address. Since the key 40 is hashed, multiple load operations may map to a single entry of the table. If an appropriate hashing algorithm is used, the effects of any interference caused by this type of aliasing should be minimal. In other embodiments, the key 40 can be derived from a combination of the program counter address and the branch history leading to the current program counter value. For example, the key 40 can be created by using a hash algorithm on a value including the program counter address concatenated with all or some bits from the branch history for that address. In one exemplary embodiment, an initial key of 21 bits may be created by putting the lower 12 bits of the program counter in the lower 12 bits of the initial key, then XORing the remaining program counter bits together in groups of 9 to supply the upper 9 bits of the initial key. The final key may be created by XORing the taken/not-taken history of the last four conditional branches into bits 8 through 11 of the key.

Including the branch history of the address in the creation of index value 42 allows better differentiation between program counter addresses which are identical in their address value, but which refer to load operations that actually load different data values stored at different data addresses, or load different data values stored in the same data memory address (for example, there may be different data values at that data address at different times, depending on the branch flow of and processing order of instructions which write values to that data address). As is well known, branch history values for program counter addresses are readily accessible in microprocessors. In still other embodiments, the key 40 can be based on the address without any processing such as hashing.

Different portions of the key 40 can be used for accessing a corresponding entry in table 16. In the example shown, key 40 includes three different portions: an index value portion 42, a tag value portion 44, and a classification group value portion 46. A number of the first (most significant) bits of the key 40 can be used as the tag value for the key 40, the remaining bits of the key can be used as the index value 42, and the classification group value can be the last two bits of the tag value 44. In one exemplary embodiment, the upper 9 bits of the key may be used as the key, while the remaining 12 bits are used as the index. If there are four classification groups, the lowest 2 bits of the index would indicate the classification group. Since, in different embodiments, the LVP table 16 can be a direct mapped or associative cache, the form of the key 40 can vary in different embodiments. A direct mapped embodiment is described herein with reference to FIGS. 2A and 2B, in which a key is indexed to one entry. In a set associative embodiment, a key can be indexed to a set of multiple entries, each entry in the set having a different tag value that is compared to the tag value of the key. In a fully associative embodiment, no index is used, and the full key is compared to the tag values in table 16.

Index value 42 is initially used to find an entry in LVP table 16 corresponding to the address from the program counter 12. The index value can be a portion of the key 40, or alternatively it can be the entire key 40. Index value 42 is used to find an entry in table 16 which has a matching indexed position in the table.

The tag value 44 portion of key 40 is also used to identify an entry of table 16 for a particular load operation, and is used to determine if an indexed entry in table 16 is pertinent to this load operation, i.e., whether a data value has been predicted for this load operation and stored in the table 16. The tag value 44 can be a portion of the key 40 or the entire key 40. The size of the tag value 44 can be based on the specific embodiment and the desired level of prediction performance.

In some embodiments, the way the index value 42 and tag value 44 are formed can influence the way the key 40 is generated. For example, the branch history of the address might only be included in determining the portion of the key that is used as the tag value 44, not the index value 42. Such different derivations, along with choosing the particular hashing algorithm used to form the key, can be used to take advantage of observed or expected prediction performance given a particular table organization.

The classification group value 46 is an index into a classification field of an entry in the LVP table 16 that matches the key 40. The classification field in each entry of table 16 includes a number N entries, where each classification entry is associated with one of the addresses which maps to that table entry. The classification group value 46 points to the classification entry corresponding to the particular address providing key 40. For example, in the described embodiment, the classification group value 46 is a portion of the tag value 44.

FIG. 2B is a diagrammatic illustration of an example of an LVP table 16 of the present invention. LVP table 16 includes a number of entries 50, each entry 50 corresponding to one or more program counter addresses referring to a load operation for obtaining a data value from memory. In one example implementation, the LVP table can include 4,096 entries. In one embodiment, the table 16 can be initialized with a predetermined value, e.g., a low value in the confidence parameter field 58 (described below), and is filled with information over time as load operations are performed by the microprocessor. Alternatively, the table can have initial random values and a field or bit for each entry to determine whether that entry is valid or not. Alternatively, the table can have initial random values with no valid bit—because the method of the present invention automatically corrects incorrect predictions in the table, the table is self-correcting. However, the unpredictable initial execution resulting from such an embodiment may be undesired in particular embodiments.

As indicated above, the LVP table 16 can be direct mapped or associative, similar to other caches. A direct mapped embodiment is described herein, in which a key is indexed to one entry. In other embodiments, other schemes can be used. For example, in a set associative embodiment, a key can be indexed to a set of multiple entries, each entry in the set having a different tag value that is compared to the tag value of the key. In a fully associative embodiment, no index is used, and the full key is compared to the tag values in table 16.

Each entry 50 in LVP table 16 includes an index 51, which is used to identify the entry. Each index 51 is an implied index value which is based on the position of the associated table entry and is in a range of indexes corresponding to the possible results when obtaining the index value 42 for the key 40 as described above. For example, each index 51 can correspond to an index value of a previous key used to access that entry, the key obtained from an address and/or branch history of that address as explained above with reference to FIG. 2A. Since the index value 42 of a key 40 is derived from a hashed value and is a portion of the hashed value in the described example, each index 51 is a hash bucket that matches multiple different load operation addresses that may hash to the same index value 42.

The index value 42 of key 40 is used to access the table 16. When a lookup operation is performed in table 16, the index value 42 is used to find the corresponding index 51 based on the position of the index 51 in the table 16. The indexed entry 50 is the entry for which a predicted data value for the addressed load operation will be found, if such a predicted value has been currently stored in the table 16.

Each entry 50 also includes a tag field 52, which is used to determine whether a predicted data value exists or not in table 16 for the particular load operation. The tag field 52 stores a tag value 44 of a previous key 40 that indexed to this entry 50 and was stored in the entry 50 previously. The tag field 52 thus is equivalent to the form of the tag value 44 in the key 40 as described above. The tag value 44 of the current key 40 is compared to the value in tag field 52 to determine if there is a match or not, i.e. a hit or a miss. A hit indicates that a predicted data value exists in the table for the load operation at the address, while a miss indicates that no such predicted data value is currently stored. The actions taken after such determinations are described in greater detail below with respect to FIG. 3.

Each entry 50 in table 16 also includes a data value field 54, which stores the predicted data value result for the load operation at the memory address that has been matched with this entry via the index field 51 and tag field 52. The width of the data value field should match the maximum data width of a load value subject to load value prediction. For example, in an architecture that supports load value prediction for loads of up to 32 bits wide, the data value field would be 32 bits wide. This predicted data value was the result of executing a previous load operation matching the key 40 used to access this entry, and may be replaced by another data value after execution of this load operation, based on whether there was a miss with the tag value 44 and tag field 52, and/or based on the accuracy of the data value prediction, as described in greater detail below with respect to FIG. 3.

Each entry 50 in table 16 also includes control information 56, which assists in the prediction and use of the predicted data values of the present invention. This information 56 includes a confidence parameter 58 and a collision parameter 60.

Confidence parameter 58 assists in the determination of whether an entry's data value 54 is accurate enough to be used for speculative execution of dependent operations, i.e. it indicates the confidence that the predicted data value 54 will be the correct value for the load operation associated with this entry 50. For example, the confidence parameter can be a value ranging from 0 to X, where X is a predetermined upper limit. (Alternatively, the confidence parameter can range from a negative value to a positive value.) Associated with the confidence parameter is a confidence threshold value that is associated with the entire table 16. For example, the confidence threshold T can be a number ranging from 0 to X+1. If the confidence parameter compares favorably to the confidence threshold, then the load data for the load operation is considered predicted sufficiently accurately and the data value 54 is used as the predicted loaded data value for this load operation. In the described embodiment, this favorable comparison occurs if the confidence parameter for an entry 50 is greater than or equal to the confidence threshold.

The ranges of the confidence parameter 58 and the confidence threshold can be related to the penalty in time and/or processing performance when misprediction of the data value occurs. A particular architecture may be implemented so that the penalty for mispredicting a data value is small, and little processing time would be lost when rolling back operations executed based on a mispredicted data value. In other architectures, the processing or time penalty may be large to roll back such speculatively executed operations, so that misprediction should be avoided when possible. If the penalty is small, then a relatively small number can be used as the confidence range maximum X, such as 4. If the penalty is large, then the value X can be scaled up accordingly. A larger value of X can make it more difficult for a data value 54 to be considered an accurately predictable data value in the table 16, and thus some performance gain will be lost, but such lost gain is outweighed by the misprediction penalty. In some embodiments, a dynamic confidence threshold can be used for the table 16, which is described in greater detail below after the description of FIG. 3.

Collision parameter 60 assists in the determination of whether an existing entry 50 of table 16 should be replaced by a new entry based on the current program counter address. Each time that a miss occurs, i.e., when the tag value 52 of a key 40 does not match the value in tag field 52 of an indexed entry 50 (matched via the index value 42), the collision parameter value 60 in that entry 50 is incremented by one (or by some other predetermined value), until saturating at a maximum value Y, e.g. 7. Also, each time that the entry 50 has a correct predicted data value 54 that thus accurately predicted the loaded value for a load operation, the collision parameter value 60 is decremented by a value Z, e.g. 5, until saturating at a lower limit, e.g., zero. An entry 50 with a high collision parameter value 60 therefore has had several misses and thus does not match many addresses being hashed to this entry 50 (and so this entry 50 may not have much value in the table 16), while an entry 50 with a low collision parameter value 60 has recently provided a correct predicted data value (which is an entry that is desirable to have in the table 16). These considerations are used in the decision whether to replace the current entry 50 with a new entry. This is described in greater detail with respect to FIG. 3. In other embodiments, the collision parameter (and other parameters described herein) can be adjusted or changed in other ways to indicate the desired information (e.g., changed in one direction or changed in the opposite direction, as needed).

Each entry 50 in table 16 is also associated with a classification field 62. The classification field can be allocated as a field of an entry 50, or as a separate entry in a different table that is indexed or pointed to. Each classification field 62 includes N classification entries 64, where each classification entry 64 holds a value. N is a number of different groups of addresses that all map to the single entry 50, via the hash mechanism or other mapping as described above; there are thus N classification groups, each group including a fraction of the addresses that map to entry 50. The basis for belonging to a particular group can be a portion of the tag value 44 for a particular address. For example, the last two bits of the tag value 44 can indicate a classification group. The two bits thus address one of four different groups, where N is 4, and a quarter of the addresses mapping to entry 50 are thus in each of the four groups. A classification entry 64 is used to help determine if an existing entry 50 should be replaced with a new entry that is based on the current key 40. The classification entry is also used to determine the starting confidence parameter value for such a new entry 50.

The classification entry indicates whether the last data value of its classification group evicted from the associated entry 50 was highly predictable or not, based on the associated confidence parameter 58 when it was evicted. In one embodiment, each classification entry 64 in the classification field 62 is implemented as a single bit indicating high predictability (e.g., a bit value of 1) or low predictability (e.g., a bit value of 0) of the last data value belonging to that classification group and evicted from the entry 50. The use of the classification entries 64 is described in greater detail with respect to FIG. 3.

Figure 3:
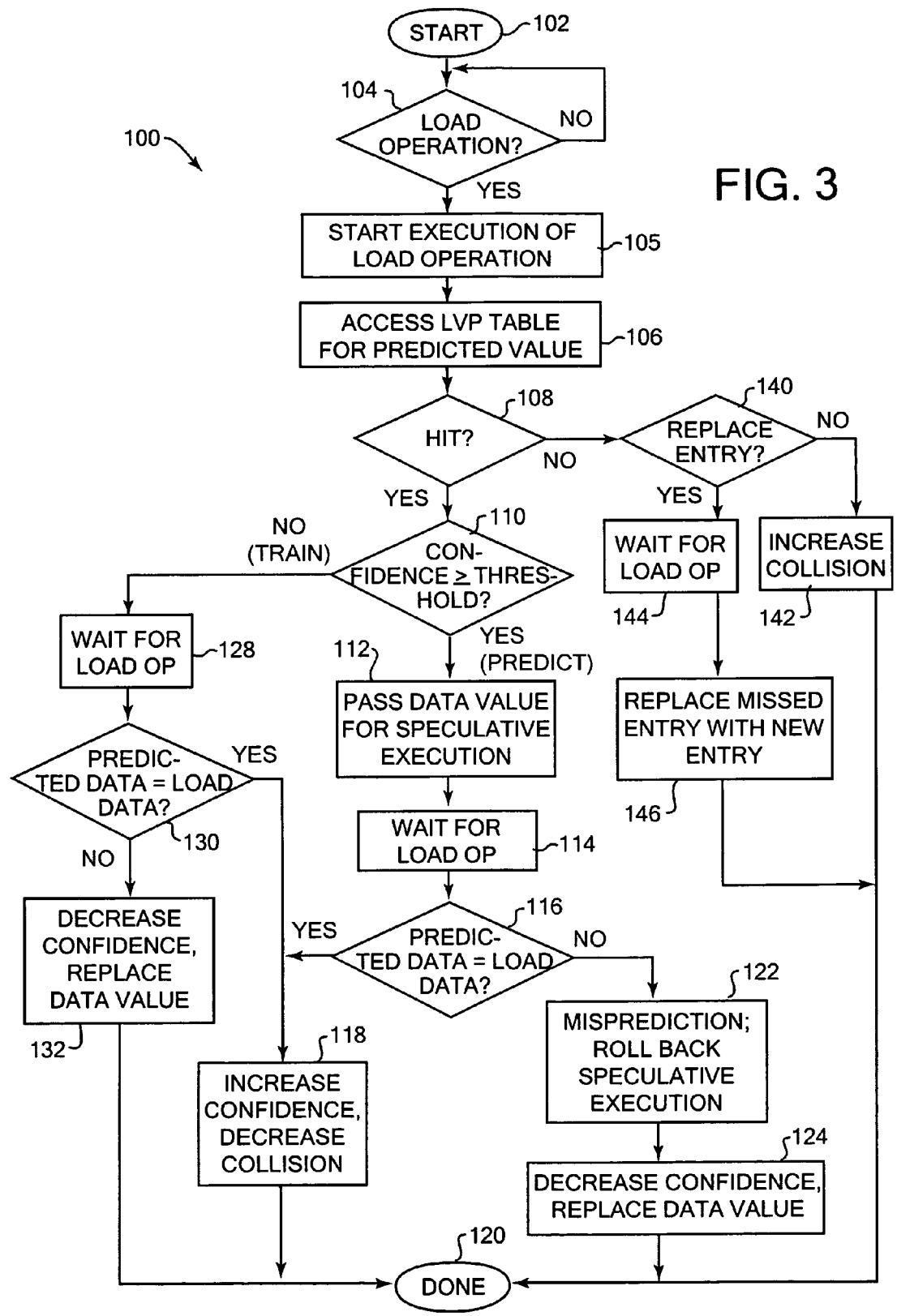
FIG. 3 is a flow diagram illustrating a method of the present invention for predicting data values to be read from memory for load operations.

FIG. 3 is a flow diagram illustrating a method 100 of the present invention for predicting the data values to be read by load operations of a microprocessor. Method 100 can be implemented by hardware components of a microprocessor architecture, an example of which is shown in FIG. 1 as architecture 10. Alternatively the method can be implemented partially or completely using firmware or code running on the microprocessor, where the invention or portions thereof can take the form of program instructions or code stored on and accessible from a tangible computer readable medium, such as an electronic, magnetic, optical, electromagnetic, infrared, or semiconductor medium, and examples of which include memory (random access memory (RAM), a read-only memory (ROM), etc.), hard disk drive, optical disk (CD-ROM, DVD-ROM, etc.).

The LVP controller (LVP predictor 14 and LVP comparator/updater 20) is described as performing many of the steps of the present invention related to the LVP processing, but these steps can alternatively be performed by one or more other appropriate components in a microprocessor. Some of the steps may be performed in a different order to that shown, or partially or completely simultaneously, e.g. as dictated by a particular microprocessor architecture. The term "replace" is used herein to refer to writing over a predicted data value in the table 16 with another data value, or to replacing an entire entry of the table with a new entry.

The method begins at 102, and in step 104, the process determines whether a load operation is to be executed by the microprocessor. In one embodiment, the instruction fetcher 22 of microprocessor architecture 10 obtains a stored instruction address from the program counter 12 and fetches the corresponding instruction from memory 24, and the instruction decoder 28 determines whether the instruction is a load instruction including a load operation. If the instruction is a load instruction, the instruction decoder 28 then informs the LVP predictor that it is a load operation and the steps following step 104 can be performed.

In an alternate embodiment, as soon as the instruction fetcher 22 obtains the address of a new instruction from the program counter 12, the address is passed to the LVP predictor 14, thereby assuming that this address refers to a load operation; the LVP predictor then immediately starts the process of looking for a match in the LVP table 16. This allows the load value prediction processing of the present invention to begin as quickly as possible and potentially provide a predicted data value to the execution unit 30 sooner than if the lookup starts after the instruction is fetched and identified as a load instruction. Of course, if it turns out that the retrieved instruction is not a load instruction, then any LVP processing can be cancelled or ignored.

In some implementations, only one load operation is provided in each addressed instruction, so that the program counter address is sufficient to distinguish each load operation. In other implementations, multiple load operations may be included in an addressed instruction. In such a case, further addressing can be used to point to a particular load operation in an instruction. For example, sub-address information can be used in conjunction with the program counter address for this purpose, whenever the program counter address is referred to herein.

Thus, if the instruction to be executed based on the program counter address does not perform a load operation, the process returns to step 104 to wait for an instruction performing a load operation. If the instruction performs a load operation, then the process continues to step 105, in which the normal execution of the load operation is begun using instruction decoder 28 and execution unit 30.

Next step 106 can be started at the same time as step 105 (or earlier, at the time of receiving the instruction address, as explained above). In step 106, the LVP table 16 is accessed, similarly to a cache, in an attempt to match the program counter address with an entry in the table 16 and find a predicted data value. In the microprocessor architecture example of FIG. 1, the LVP predictor receives the program counter address from the instruction decoder 28 or alternatively some other component of the microprocessor in the fetch and execution path.

To look up a matching entry in the LVP table 16, the address can first be processed to obtain a key 40 having an index value 42 and tag value 44 equivalent to the form of these values in the LVP table 16. This processing can include hashing all or part of the address and/or the branch history of the address to obtain the index value 42 for the key 40, as described above with reference to FIGS. 2A and 2B. The indexes of the entries 50 of table 16 correspond to the indexes derived from processed, e.g. hashed, versions of an address.

The other parts of the key 40 for the obtained address can also be determined. This includes designating or creating the tag value 44 based on the address, where the tag value may be all or part of the processed (e.g. hashed) key 40 or the address as explained above with reference to FIGS. 2A and 2B, and includes the classification group value 46.

The table access (lookup) is performed by matching the index value 42 derived from the current address with an index 51 of the table 16. The accessed index 51 designates the entry 50 in which a predicted data value, if any, will be found for the address.

In step 108, the process checks whether there is a match for the tag value 44 of the key 40 and the value in the tag field 52 of the matched entry 50 found in step 106. If there is a match, it is a hit, and the process continues to step 110. A hit indicates that this particular key 40 has previously been used to access the table to load a data value, and that a data value is stored as a predicted data value in this entry 50. If there is no match, then it is a miss, and the process continues to step 140, described below. A miss indicates that the data value 54 stored in this entry 50 (if any) does not currently correspond to this key, e.g., the data value 54 may correspond to another address that maps to entry 50, or entry 50 is still empty.

It should also be noted that, in embodiments not using direct mapping, the steps 106 and 108 can be different. For example, in a set associative embodiment, the index value 42 can be used to access a particular set of entries in the table 16, and the tag value 44 is compared to the entries in that set to determine a hit for a particular entry (if none of the tag values of the entries in the set match, it is a miss). In a fully associative embodiment, the steps 106 and 108 only compare tag value 44 to tag values in the table 16 (there is no index value used).

If a hit is determined in step 108, then in step 110 the confidence parameter 58 stored in the matched entry 50 is compared to the confidence threshold for the LVP table 16 by the LVP predictor 14. As described above, the confidence parameter 58 for each entry 50 can range from 0 to X and the confidence threshold range from 0 to X+1, for example. If the confidence parameter 58 of the matched entry 50 is greater than or equal to the confidence threshold, then the data value load for the load operation is considered to be accurately predictable (i.e., high probability that the predicted value will equal the actual loaded data value), and the process continues to step 112. If the confidence parameter 58 is less than the confidence threshold, then the data value is not considered to be sufficiently accurately predictable, and the process continues to step 128, described below.

If the confidence value was equal to or greater than the threshold in step 110, then in next step 112 the predicted data value 54 of the matched entry is stored in temporary storage 18 (as shown in FIG. 1), such as a register, and can then be retrieved from the register by the execution unit 30 for use with speculative execution of dependent operations that were issued after the load operation but which are waiting on the data value to be loaded by the load operation. The predicted data value, retrieved from the table, is a data value provided for use before (without waiting for) the completed execution of the load operation retrieving that data value. The dependent operations can thus be executed now using the predicted data value, which is much sooner than if the dependent operations had to wait for the actual data value from memory to be loaded, and avoiding significant stalls in operation processing.

In next step 114, the process waits for the load operation, which has been executing in parallel with the above steps, to be completed and for the actual load value result of the load operation to be available. Once the actual data value has been loaded, then step 116 is performed, in which the predicted data value is compared to the loaded data value. The LVP comparator 20 can make this comparison, using the data values provided to it from temporary storage 18 and the execution unit 30. If the predicted data value equals the loaded data value, then the prediction was accurate, and the load operation effectively appears as if it had completed at the time of the prediction, i.e. at the time the predicted data value 54 was received by the execution unit in step 112. The process then continues to step 118, in which some entry parameters are updated: the confidence parameter 58 is increased in value, and the collision parameter is decreased in value. The confidence parameter is incremented by a value A and saturates at the upper limit of the value X. Thus the confidence parameter is increased to reflect each accurate prediction, allowing this predicted data value to continue to be used for future load operations corresponding to the entry 50 with even more confidence that it is an accurate prediction. The collision parameter is decremented (by one or other predetermined value) to indicate that this matching entry 50 provides accurate predictions, which is taken into account when deciding to replace the entry 50 with another entry or not, as described below for step 140. The process is then complete at 120.

If the predicted data value does not equal the loaded data value in step 116, then a misprediction has occurred. The process continues to step 122, in which any speculative execution of dependent instructions performed via step 112, based on the predicted data value, is rolled back. Any such speculative execution was based on a predicted data value that turned out to be incorrect, and so the microprocessor state must return to a point prior to the incorrect execution. Thus, any speculatively issued operations still being performed are immediately cancelled, and these operations are reissued with the actual load data resulting from the load operation. A misprediction therefore can have a high cost, since processing time may be wasted for incorrect operations and for rolling back the states of registers and other components of the microprocessor.

In an alternate embodiment, the misprediction penalty can be limited to reduce the consequences of misprediction. The penalty for misprediction can be very high, especially in a superscalar, out-of-order processor and where a large number of instructions would need to be rolled back. It is therefore desirable to minimize the number of cases of misprediction (through the use of high confidence thresholds, etc.) as well as to reduce the penalty for a misprediction. Unlike branch prediction in which the architectural state always moves forward in a speculative fashion and a misprediction requires the state from subsequent instructions to roll back, load value prediction only affects those subsequent dependent consuming operations which use the mispredicted data value. If none of the dependent operations have executed by the time the misprediction has been caught, then only the predicted data value itself needs to be corrected, and complete instruction rollback is not required. Thus, the consumption of predicted data values can be tracked to determine if any rollbacks are required. For example, if there are n physical registers in the microprocessor, an n-bit vector can be provided in memory, each bit of the vector being associated with a register. Whenever a predicted data value is to be used for speculative execution and is written to a register, the bit of the vector corresponding to that register is set. Whenever the value in a register is read (by dependent operations), the corresponding bit in the vector is cleared. Thus, when a misprediction occurs, the vector bit associated with the predicted data value's register can be checked. If that bit is still set, then it indicates that no dependent operations have yet read the predicted data value, and no downstream corruption has taken place; the correct, loaded data value can then be written to the register and execution continues normally, so that rollback is avoided. If that bit is cleared, however, then it indicates that the mispredicted data value has already been read from the register for speculative execution, and that rollback of dependent operations will be required to maintain correct operation. Other, similar embodiments can be implemented, where the predicted data value is stored in some other temporary storage.

In step 124, after a misprediction is determined, LVP updater 20 updates the control information in the accessed entry of the table and replaces the existing data value 54 with a new data value. The updating of control information includes decreasing the confidence parameter 58 of the matching entry 50. The confidence parameter 58 is decremented by some value B, and saturates at a lower limit of zero (in the described embodiment). In many embodiments it is advantageous to set B to a much higher value than the A value used to increment the confidence parameter 58 when the predicted data value is accurate. This is because in typical cases the penalty resulting from a misprediction is much greater than the benefit resulting from a correct prediction of the data value. After one or more mispredictions, depending on the magnitude of B, a confidence parameter over the threshold will eventually go under the threshold. For example, in a confidence range of 0 to 31, the value A can be set to 1 and the value B can be set to 31.

In addition, the predicted data value 54 stored in the accessed entry 50 is replaced (written over) with the loaded data value resulting from the load operation by LVP updater 20. The old data value 54 was determined to be incorrect for the load operation and so should not be used as a predicted value for future load operations corresponding to (associated with) entry 50, while the new loaded data value is thus more likely to yield a correct data value result for future load operations associated with entry 50. The new loaded data value 54 is thus associated with the decremented confidence parameter 58 in that entry 50. In some cases in which the confidence parameter is suitably high (before decrementing), there may be a slight advantage to keeping the previous predicted value instead of replacing it with the new loaded data value to the LVP table. E.g., if the confidence parameter (before decrementing) is at least the prediction threshold minus six, the old predicted value can be retained. The process is then complete at 120.

Referring back to step 110, if in step 110 the confidence parameter 58 of the matching entry 50 is less than the confidence threshold, then the data value 54 stored in that entry is considered not predictably accurate enough to be used for speculative execution of dependent operations. However, "training" of the matching entry 50 can take place. The process continues to step 128 to wait for the load operation to be completed and for the load value result of the load operation to be available. Then step 130 is performed by the LVP comparator 20, in which the predicted data value is compared to the loaded data value. If the predicted data value equals the loaded data value, then the prediction was accurate. The process continues to step 118, in which the confidence parameter 58 for the matching entry 50 is increased in value, and the collision parameter is decreased in value, as described above.

Thus the confidence parameter is increased to reflect each accurate prediction, "training" this entry 50 by increasing the confidence parameter. Even if the predicted data value was not used for speculative execution, an accurately predicted data value will have its confidence parameter increased. In this manner, an accurately-predicted data value 54 will eventually train its confidence parameter value above the confidence threshold, thus reaching a point where the associated data value 54 can be used for speculative execution of dependent operations. The process is then complete at 120.

If in step 130 the predicted data value does not equal the loaded data value, then the predicted data value 54 for the matching entry 50 is not accurate and the entry 50 should be designated as a less accurate predictor of the loaded data value, and the data value should be replaced. Accordingly, the process continues to step 132, in which the predicted data value 54 which did not match the actual data value is discarded and replaced with the loaded data value, similarly as described above for step 124. In addition, the confidence parameter 58 for the entry 50 is decreased, similarly as explained above for step 124. Although it is a new data value in entry 50, the confidence parameter is decreased so that the new data value will have to prove itself with accurate predictions before its confidence parameter is raised to its former higher level. The process is then complete at 120.

Referring back to step 108, a miss occurs in the LVP table 16 when the tag value of the key 40 does not match the value in the tag field 52 of the matching entry 50 in the table (i.e., the existing entry does not store a data value that corresponds to the load operation). Thus, if such a miss is detected in step 108, the process continues to step 140, in which the LVP controller (e.g., LVP predictor 14) determines if it should replace the entire matching entry 50 in the table with a new entry corresponding to the key 40 and to the loaded data value resulting from the current load operation. An entry 50 is not automatically replaced upon a miss in the present invention, because it would not be desirable, for example, to evict a highly predictable load value 54 that may likely be accessed again soon, and replace it with a possibly unpredictable load value that may never be accessed again.

Thus, the present invention allows only more desirable data values to be stored in the table 16, which are data values that have been determined to be likely to be more accurate predictions for future load operations than currently-stored data values. Since a larger table requires more memory and other resources, the present invention allows a smaller table to efficiently be used in limited space by increasing the accuracy of predicted data values stored in that limited space, thereby obtaining benefit based on the quality of the table contents.

The collision parameter 60 and classification field 62 of the entry 50 are used to determine whether the missed entry should be evicted and replaced. Step 140 decides to evict the missed entry 50 and replace it with a new entry based on the current key 40 and actual data value, if the new entry is more likely than the entry to yield a correct predicted data value for future load operations. The collision value 60 approximates how many misses have occurred that could have hit in that entry since the last correct prediction that that entry provided. A higher collision value implies that either the current entry has not been used in a while or that it does not contain an accurate, reliable prediction. Either of these possibilities suggests that the current entry can be judged as less useful as the collision value increases.

In the described embodiment, the determination of whether the new entry is more likely to yield a correct predicted data value result for future load operations includes checking if the entry has a high collision value 60, or if the entry has a medium collision value 60 and the replacement data value has been determined to be highly predictable. The collision value determination is accomplished by comparing the collision parameter 60 of the entry 50 with predetermined thresholds. The determination of high predictability is determined by examining the one classification entry 64 in entry 50 that corresponds to the address of key 40, as determined by the classification group value 46 in the key 40 (key 40 provides the potential replacement address information for the entry). More specifically, the LVP controller decides to evict the missed entry 50 if the collision parameter value 60 of the entry is greater than a predetermined high-replace threshold, e.g. the maximum collision parameter value, or if the collision parameter value 60 of the entry is greater than a predetermined low-replace threshold, e.g. 2, and the particular classification entry 64 corresponding to the classification group value 46 of key 40 indicates that the last evicted data value of entry 50 that belonged to the same classification entry (group) as the replacement (key 40), was highly predictable. For example, a classification entry bit of 1 can indicate high predictability, while a classification entry bit of 0 can indicate a low predictability. Thus, eviction takes place when the collision value is greater than the high-replace threshold; or when the collision value is greater than the low-replace threshold and the corresponding classification bit equals 1.

This test for eviction thus tests for two possible conditions. In the first condition, a high collision is tested for; this would indicate that the entry 50 is not often correct or not often used, and so can be replaced with little harm. In the second condition, a medium collision is tested for; and since this is not considered sufficient to replace the entry, another test is made, using the classification entry 64 for the classification group corresponding to the key 40. This classification entry indicates whether the last data value in the key's classification group was considered highly predictable or not. (More generically, the classification entry determines the collision threshold (e.g. from a table) used to make the replacement decision; with a 1-bit classification value, two thresholds are used.) This classification entry was set based on that last data value's confidence parameter 58 at the time of its eviction, using a predetermined high predictability threshold C. For example, a high predictability is designated if the confidence parameter value has a value greater than or equal to C, where C is some value in the confidence parameter range. E.g., C can be the confidence threshold minus two. When using a single bit for a classification entry value as in the example above, a classification entry of 1 thus indicates that the last data value in the same classification group as the current key 40 had a high predictability (accuracy) when it was evicted. Therefore, using the current key 40 as the basis for whether the new replacement data value will also have a high predictability, which is a good additional criterion when deciding to evict the missed entry 50 and replace it with the new address and data value. If, however, the collision parameters are too low for the above conditions and/or the classification entry indicates a low predictability for data values in the replacement's classification group, then the missed entry will not be replaced at this time. (Of course, missed entries 50 which are currently empty (not yet filled with any LVP information) are automatically filled with the new entry.)

In an alternate embodiment employing a fully-associative table 16, there would not be an indexed entry to replace if a miss occurred. In such a case, all the entries of the table can be checked for predetermined characteristics to find a suitable entry to replace. For example, the conditions listed above to determine whether an entry should be replaced can be tested for each entry of the table, and the entry having the least favorable results (e.g., the entry having the highest collision and/or lowest confidence parameters) can be replaced with the new entry.

Thus, if the LVP controller has decided to not replace the missed entry, the process continues to step 142, in which the collision parameter 60 of the missed entry is incremented. As explained above, a high collision value can indicate that previous misses have occurred for this entry, and thus the entry is not being used frequently. The process is then complete at 120. In some embodiments, the collision update can wait until the load operation completes execution so that the table updates and replacements always take place at the same time, no matter what sort of update or replacement is made.

If the LVP predictor has decided to replace the missed entry, the process continues to step 144, in which the process waits for the load operation, which has been executing in parallel with the above steps, to be completed and for the loaded data value result to be available. Once the data value has been loaded, then step 146 is performed, in which the missed entry 50 is evicted and replaced with new information that is stored in that entry. Specifically, the loaded data value is stored as data value 54 of the entry. In addition, the tag value 44 of the key 40 is stored in the tag field 52, and the collision parameter 60 is set to a low value, e.g. 1. The classification entry 64 in the same group as the table entry 50 that was just evicted, is set to indicate high or low predictability based on the confidence parameter 58 of that evicted entry, e.g., a value of 1 if the confidence parameter was over the high threshold C, a value of zero if below C. (The classification entry in the group of the replacement entry is not evicted or written over, unless the replaced group is the same as the replacement group.)

Finally, the confidence parameter 58 for the replacement entry 50 is set to an initial value based on the classification entry 64 corresponding to the replacement entry's classification group (as determined by classification group value 46 of the key 40). For example, a high predictability (e.g., a classification value of 1) can correspond to a confidence parameter closer to the confidence threshold, e.g., a value just below the confidence threshold, such as the confidence threshold minus two. A classification value indicating low predictability (e.g., a classification value of 0) can indicate a low initial confidence value for the replacement entry; in one example, this initial confidence value can equal the confidence threshold minus four. The process is then complete at 120.

The present invention therefore replaces an entry of the table (cache) with a new entry based on the current load operation, if the new entry is likely to yield more correct predictions of data value loads than the existing entry that provided a cache miss. This makes better use of a limited-sized table since only entries that are likely to be accurate predictions are written in the table.

In some embodiments of the present invention, several load operations can be initiated simultaneously or have at least portions of their operations be executing at the same time. For example, microprocessor implementations using a deep pipeline and/or out-of-order execution can have several operations coexisting. The present invention can thus be predicting data values for many outstanding operations in such embodiments. For example, multiple datapaths, each datapath duplicating the components of the present invention as in FIG. 1, can be used; or some components can be shared among multiple datapaths, such as LVP table 16.

In some embodiments, the method 100 can be optimized to reduce power consumption. For example, some portion of the LVP table 16 is typically changed on every load operation, but not every field of an entry in the table is changed at once. Also, some parameters of the table 16 do not need to be updated if they are already saturated at an upper or lower limit of the acceptable range of values for that parameter (e.g., the confidence parameter 58 does not need to be updated when a correct prediction occurs if the confidence parameter is already at its maximum allowed value). Thus, to save power consumption, only the changing fields of the table need be changed for every load operation. As examples, only the collision parameter 60 need be updated when a miss occurs (in step 108) and no replacement table entry is written. The tag value, classification, collision, confidence, and data values are updated or replaced when a miss occurs and a replacement table entry is written. Only the collision and confidence parameters need be updated when a hit occurs and the predicted data value is correct (and no update is needed if both values have saturated at the maximum value). Only the confidence parameter and data value need be updated/replaced when a hit occurs and the predicted data value is incorrect (a misprediction).

There are also several methods of the present invention that can be utilized to reduce the power consumed by LVP operations. One method is to classify some load operations as "unpredictable" and not viable for prediction and skip one or more operations involved in predicting a data value for those load operations. In one embodiment, a load operation is indicated to not be viable for prediction by a dynamic characteristic of the load operation. The dynamic characteristic can be any characteristic of the particular load operation that can change during operation, and is not a static characteristic generally known about the operation based on its classification, function, type (e.g., an integer load operation), etc.

For example, in one embodiment, the unpredictable load operations are determined by examining the confidence parameter of the table entry corresponding to the load operation. A new "unpredictable threshold" can be provided for the LVP table 16, which is similar to the confidence (prediction) threshold, except the new threshold is at a different confidence level. A predetermined relationship between the confidence parameter, the unpredictable threshold and the confidence threshold can indicate unpredictability. For example, the unpredictable threshold can be at a lower confidence level than the confidence threshold, indicating less confidence in the entry. Should the confidence parameter of an entry go below the unpredictable threshold (e.g., below a threshold of 4), that entry is considered "unpredictable." If that occurs, prediction or training will only occur every 1/M accesses based on a counter that is incremented every time any unpredictable entry in the table is accessed, where M is a number large enough that most accesses to this class of unpredictable load values will not be predicted (it is still checked 1/M accesses just in case the entry rises in accuracy and confidence). For example, in one embodiment, M can be 32. In an alternate embodiment, each entry in the table can be associated with its own independent counter for M, so that each entry will be accessed every 1/M accesses.

Thus, the confidence parameter of the matching entry can be checked, and if the entry is considered unpredictable, one or more of the remaining operations of the prediction process for that load operation are skipped. All the remaining operations of the prediction process can be skipped, or a subset of the remaining operations. This can save the power consumed from performing these operations of the prediction process, which are now avoided. The remaining operations can include reading other needed information, such as the predicted data value, from the table entry (unless the entire entry is read at once, in some embodiments), storing the predicted data value in temporary storage (or other intermediate operations), comparing the predicted data value with the loaded data value, writing to the LVP table 16 (including replacing the predicted data value and/or updating information in the table), and/or performing overhead processing with control information in the table. For example, in one embodiment, if the load operation has a hit in the table and the confidence parameter indicates an unpredictable load, then all write operations to the table can be skipped as well as the storing of any intermediate data needed for the prediction operation.

When all or some of the prediction operations are skipped, the microprocessor can wait for and use the actual loaded data value.

Should the load data value become predictable or if a predictable load data value is mapped to the same entry 50, the entry will eventually be evaluated and its confidence parameter will go above the unpredictable threshold. If such an unpredictable threshold is used to define this lower range of confidence values, then the decreasing of the confidence parameter in steps 124 and 132 should not lower the confidence all the way to the minimum confidence value, but should lower it by a smaller amount. For example, in one embodiment, if the unpredictable threshold is 4, a decrement from 5 or above could saturate at a minimum of four, while any confidence parameter of 4 or less could decrement by just 1 to a minimum of zero.

In a different embodiment designating loads unpredictable and not viable for prediction, the type of the load operation can be examined to determine if prediction is viable for that load operation. For example, a load operation may be of a type which accesses a data value stored in a particular region of memory that does not allow caching of data values from that region of memory (in a cache such as the load value prediction table 16), such as memory mapped I/O in some architectures, or the data value has a location or characteristic which prevents the use of the load value prediction process in some other way. Or, a particular architecture may not allow caching or prediction for certain types of load operations, based on the load operation itself or the data values to be loaded. These non-viable types of load operations can be identified before any prediction takes place in some embodiments, or during the start of the prediction process in embodiments where the prediction process is started immediately upon program counter retrieval. For example, the decoder 28 can determine the type of a load operation based on predetermined criteria, and if the load operation is not viable for prediction, can inform the LVP controller 14 to skip the prediction process (or operations remaining in the prediction process, if that process has already started). This saves the power consumption that would have been wasted in the prediction process for a load operation that is not compatible with that process.

Furthermore, consumption of system resources can be reduced with other features of the invention. Some embodiments can reduce data storage requirements for dedicated logic required for the prediction operation of the present invention. For example, data storage is required for components such as the LVP table 16, associated control logic, and storage and datapath elements used for the values and for the periods between the table read, the point when the load data becomes known, and the table write. Such components can potentially require a large amount of storage, especially in a deep pipeline and/or out-of-order execution environment where many outstanding predictions can coexist.

One way to reduce the amount of storage is to take advantage of the register renaming that typically is used for increased efficiency for parallel processing. With register renaming, the destination of the load is guaranteed to avoid write-after-write (WAW) or write-after-read (WAR) hazards. This allows the predicted data value result of the load to be immediately placed in the register file as soon as renaming occurs and before the predicted data value has even been issued to the execution pipeline. Thus a register 32 in the register file can be used to store the predicted data value as the temporary storage 18, instead of using a separate temporary storage. Furthermore, since a predicted data value can be stored in the same physical register as its corresponding actual loaded data value will be stored, dependent operations can directly read this result register as a source (as they would with no prediction), and thus special bypassing or read capabilities are not needed. The actual loaded data value can be stored over the predicted data value in the same physical register which stores the predicted data value, thus avoiding the cost of additional storage to store the predicted data value. In some embodiments and/or circumstances, before the actual loaded data value has been stored in the register, the comparison between predicted data value and loaded data value can be performed, and if these values are found to be the same, the loaded data value need not be stored in the register (if there is sufficient time for the comparison). If the predicted data value is different from the loaded data value, the loaded data value is stored in the register, and a misprediction has occurred—dependent operations must be rolled back, then the original register can be accessed for the rollback to obtain the original data stored prior to the renaming (the original data can be stored in the same original physical register while the predicted data value is stored in the renamed register, or vice-versa).

A second benefit can occur after the load operation actually executes and the loaded data value is available for comparison with the predicted data value. A load operation typically reads only address operands, but store operations are commonly set up to read address operands plus use a destination register as a store data source. This means that the register file can read out the destination register for a load operation with no extra hardware cost, since all needed control logic and datapaths for reading out the value are already in place for stores. Since the predicted data value can be stored in the destination register, this read out can be the source for the comparison between the predicted data value and the loaded data value as performed by the comparator 20, with no need for additional temporary storage, control logic, or datapaths.

In addition, for load operations that miss in the LVP table 16, and therefore need control information from key 40 such as the tag value, classification values, etc. for a replacement entry that may replace the missed entry, this control information can be stored in the register file in the place of the predicted data value described above. Again, this avoids the cost of additional storage to maintain this control information until the load operation has been executed.

Dynamic Confidence Threshold

The confidence threshold described above is used for determining whether a predicted data value 54 stored in the LVP table 16 is predictively accurate enough to be used for speculative execution of subsequent dependent operations, as described with reference to step 110 of the method 100 of FIG. 3. The confidence threshold can be a predetermined static value used for the table 16, as described above. Alternatively, the confidence threshold can be a dynamic threshold of the present invention. Since some sequences of instructions tend to have more predictable behavior than other sequences, this characteristic can be exploited for greater efficiency by making the confidence threshold dynamic.

The dynamic confidence threshold can be adaptive and can be adjusted based on a variety of factors. For example, the threshold can be adjusted based on the accuracy of predicted data value results (e.g., number of predictions and/or mispredictions), how close the confidence parameter came to the current confidence threshold, whether the predicted data value results were made available (e.g., for one or more subsequent operations), and/or other behavior or characteristics of data value predictions. For example, the confidence threshold can be adjusted to a value above the possible range for the confidence parameter 58 for sequences of instructions that have particularly poor prediction accuracy and results. This would temporarily disable prediction of data values until the behavior improves and prediction again appears useful. For example, such poor prediction results can include predicted values that are accurate for a short while, and then become inaccurate.

In one embodiment, two separate statistics (e.g., counters) of prediction behavior can be kept for the dynamic confidence threshold: the number of load data values correctly predicted at a confidence parameter value equaling the confidence threshold minus one; and the number of load data values correctly predicted at a confidence value equaling the confidence threshold. The first counter indicates the number of load operations where predicted data values were not made available to subsequent dependent operations, but could have been made available if the confidence threshold were one lower. The second counter indicates the number of load operations in which the predicted data value was made available to subsequent dependent operations, but if the loaded data did not match the predicted data value, the misprediction would have been avoided if the confidence threshold were one higher.

In one embodiment, a first counter counts the number of correct training predictions in which the confidence parameter equals the confidence threshold minus one. After n such load operations (e.g. 512), if the number of correct training predictions is greater than or equal to a predetermined threshold percentage (such as 95%) of n, then the dynamic confidence threshold is decremented. A second counter counts the number of correct predictions in which the confidence parameter equals the confidence threshold. After n such load operations (e.g. 512), if the number of correct predictions is less than the threshold percentage of n (and thus the mispredictions are over a threshold of 100%−n), then the threshold is incremented. The relevant counter is reset to zero as each period n expires. The threshold percentage used for dynamic prediction threshold adjustment can differ for each different microprocessor architecture, where the threshold percentage value is chosen to balance the average performance penalty for a misprediction with the average performance gain for a correct prediction. For example, if the average performance gain is X cycles, and the average performance penalty is Y cycles, a value of $Y/(X+Y)$ can be used for the threshold percentage.

In other embodiments, different or additional techniques can be used to adjust the dynamic threshold. For example, a running average of the number of mispredictions can be kept, and this average misprediction rate can be compared (after each load operation, or after n load operations) to one or more threshold percentages similarly as described above to adjust the dynamic confidence threshold. In some embodiments, counters can be used to count correct predictions for other confidence parameter values compared to the confidence threshold, e.g., counting a correct prediction when the confidence parameter equals the confidence threshold minus 5, or the confidence threshold plus 5. In addition, the dynamic threshold can be adjusted by an amount proportional to the difference between confidence parameter and confidence threshold, such that different weights in dynamic threshold adjustment are given to different degrees of misprediction. The adjustment in dynamic confidence threshold (as based on the number of predictions or mispredictions) can alternately follow other functions or relations, e.g., a predetermined function or curve providing different adjustments based on the difference between confidence parameter and confidence threshold.

The present invention can accurately determine which load operations provide data values that are highly predictable, and predict these data values while reducing mispredictions, which have a high performance penalty. The present invention can replace a predicted data value in an entry of a load value prediction table with a loaded data value when the loaded data value has been determined to be more likely than the predicted data value to yield a correct data value result for future load operations. This replacement can occur by replacing a data value individually, or by replacing an entire entry. The invention can reduce the consumption of system resources, such as by reducing the amount of data structure accesses and operations and/or storage requirements. Such features can result in efficient avoidance of a significant amount of stalls in instruction execution during microprocessor operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for predicting a data value that will result from a load operation to be executed by a microprocessor, the method comprising:

accessing an entry in a load value prediction table that stores a predicted data value corresponding to the load operation;

providing the predicted data value as a result of the load operation without waiting for execution of the load operation to complete a confidence parameter stored in the entry exceeds a current value of a dynamic confidence threshold;

adjusting the confidence parameter based on a first pre-determined criterion, wherein the first pre-determined criterion comprises an actual data value from executing the load operation to the predicted data value;

determining a new value of the dynamic confidence threshold based on a second pre-determined criterion, wherein the second pre-determined criterion comprises calculating a prediction parameter representing statistical accuracy of predicting the data value;

accessing another entry in the load value prediction table that stores another predicted data value corresponding to another load operation, wherein the load value prediction table is accessed, at least in part, from recent branch history prior to an instruction that triggers the load operation;

providing said another predicted data value as a result of said another load operation without waiting for execution of said another load operation to complete another confidence parameter stored in said another entry compared to exceeds the new value of the dynamic confidence threshold; and wherein the new value is determined to adjust the dynamic confidence by an amount proportional to a difference between the confidence parameter and the dynamic confidence threshold.

2. The method of claim 1 further comprising decrementing the confidence parameter and incrementing a number of inaccurate predicted data values if the actual data value from executing the load operation does not equal the predicted data value.

3. The method of claim 1 further comprising incrementing the confidence parameter and incrementing a number of accurate predicted data values if the actual data value from executing the load operation equals the predicted data value.

4. The method of claim 2 wherein calculating the prediction parameter comprises comparing the number of inaccurate predicted data values to a predetermined threshold.

5. The method of claim 3 wherein calculating the prediction parameter comprises comparing the number of accurate predicted data values to a predetermined threshold.

6. The method of claim 1 wherein calculating the prediction parameter comprises tallying a number of accurate predicted data values having a confidence parameter less than and within a predetermined range of the dynamic confidence threshold.

7. The method of claim 1 wherein the new value of the dynamic confidence threshold is a value outside of a possible range for the confidence parameter for load operations in a sequence of instructions known to have poor prediction accuracy.

8. The method of claim 1 wherein calculating the prediction parameter tall, in a number of accurate predicted data values having a confidence parameter value equaling the dynamic confidence threshold minus one.

9. The method of claim 5 wherein after a predetermined number of load operations, the dynamic confidence threshold is changed if the number of accurate predicted data values is greater than the predetermined threshold.

10. The method of claim 9 wherein the predetermined threshold is determined by balancing average performance penalty for an inaccurate predicted data value with average performance gain for an accurate predictive data value.

11. The method of claim 1 wherein calculating the prediction parameter comprises tallying a number of accurate predicted data values having a confidence parameter value equaling the confidence threshold.

12. The method of claim 5 wherein after a predetermined number of load operations, the dynamic confidence threshold is changed if the number of accurate predicted data values is less than the predetermined threshold percentage.

13. The method of claim 1 wherein the second pre-determined criterion is based on a number of predicted data values that matched corresponding loaded data values and were not provided for use as predicted data values.

14. The method of claim 1 wherein the confidence parameter for the entry is changed in one direction when the predicted data value and the loaded data value resulting from executing the load operation are found to be equal, and wherein the confidence parameter for the entry is changed in an opposite direction when the predicted data value and the loaded data value are found not to be equal.

15. The method of claim 14 wherein if the confidence parameter of an entry in the load value prediction table goes below a threshold that is lower than the dynamic confidence threshold, the data value stored in that entry is considered unpredictable and is not accessed for prediction for every load operation corresponding to that entry.

16. The method of claim 1 wherein when the confidence parameter is adjusted, the confidence parameter is changed in one direction by a first amount and changed in an opposite direction by a second amount different than the first amount.

17. The method of claim 1 wherein a key is used to access the entry in the load value prediction table, wherein the key is derived, at least in part, from recent branch history prior to an instruction that triggers the load operation.

18. The method of claim 1 wherein the predicted data value is stored in a register, and wherein if the predicted data value does not equal the loaded data value, the method further comprises checking a bit associated with the register in which the predicted data value was stored to determine whether or not the predicted data value has already been used by one or more subsequent operations to the load operation to determine whether the subsequent operations are to be rolled back.

19. A microprocessor operative to predict a data value that will result from a load operation to be executed by the microprocessor, the microprocessor comprising:
   a mechanism operative to access an entry in a load value prediction table that stores a predicted data value corresponding to the load operation;
   a mechanism operative to provide the predicted data value as a result of the load operation without waiting for execution of the load operation to complete if a confidence parameter stored in the entry exceeds a current value of a dynamic confidence threshold;
   a mechanism operative to adjust the confidence parameter based on a first pre-determined criterion, wherein the first pre-determined criterion comprises comparing an actual data value from executing the load operation to the predicted data value;
   a mechanism operative to determine a new value of the dynamic confidence threshold based on a second pre-determined criterion, wherein the second pre-determined criterion comprises calculating a prediction parameter representing statistical accuracy of predicting the data value;
   a mechanism operative to access another entry in the load value prediction table that stores another predicted data value corresponding to another load operation, wherein the load value prediction table is accessed, at least in part, from recent branch history prior to an instruction that triggers the load operation;
   a mechanism operative to provide said another predicted data value as a result of said another load operation without waiting for execution of said another load operation to complete if another confidence parameter stored in said another entry exceeds the new value of the dynamic confidence threshold; and
   wherein the new value is determined to adjust the dynamic confidence by an amount proportional to a difference between the confidence parameter and the dynamic confidence threshold.

20. The microprocessor of claim 19 further comprising a mechanism operative to decrement the confidence parameter and increment a number of inaccurate predicted data values if the actual data value from executing the load operation does not equal the predicted data value.

21. The microprocessor of claim 19 further comprising a mechanism to increment the confidence parameter and increment a number of accurate predicted data values if the actual data value from executing the load operation equals the predicted data value.

22. The microprocessor of claim 21 wherein calculating the prediction parameter comprises comparing the number of accurate predicted data values to a predetermined threshold.

23. The microprocessor of claim 19 wherein calculating the prediction parameter comprises tallying a number of accurate predicted data values having a confidence parameter less than and within a predetermined range of the dynamic confidence threshold.

24. The microprocessor of claim 19 wherein calculating the prediction parameter comprises tallying a number of accurate predicted data values having a confidence parameter value equaling the dynamic confidence threshold minus one.

25. The microprocessor of claim 19 wherein after a predetermined number of load operations, the dynamic confidence threshold is changed if the number of accurate predicted data values is greater than the predetermined threshold.

26. The microprocessor of claim 19 wherein calculating the prediction parameter comprises tallying a number of accurate predicted data values having a confidence parameter value equaling the confidence threshold.

27. The microprocessor of claim 22 wherein after a predetermined number of load operations, the dynamic confidence threshold is changed if the number of accurate predicted data values is less than the predetermined threshold percentage.

28. A tangible non-transitory computer readable medium including program instructions to be implemented by a computer and for predicting a data value that will result from a load operation to be executed by the microprocessor, the program instructions for:

accessing an entry in a load value prediction table that stores a predicted data value corresponding to the load operation;

providing the predicted data value as a result of the load operation without waiting for execution of the load operation to complete if a confidence parameter stored in the entry exceeds a current value of a dynamic confidence threshold;

adjusting the confidence parameter based on a first pre-determined criterion, wherein the first pre-determined criterion comprises comparing an actual data value from executing the load operation to the predicted data value;

determining a new value of the dynamic confidence threshold based on a second pre-determined criterion, wherein the second pre-determined criterion comprises calculating a prediction parameter representing statistical accuracy of predicting the data value, accessing another entry in the load value prediction table that stores another predicted data value corresponding to another load operation, wherein the load value prediction table is accessed, at least in part, from recent branch history prior to an instruction that triggers the load operation;

providing said another predicted data value as a result of said another load operation without waiting for execution of said another load operation to complete if another confidence parameter stored in said another entry exceeds the new value of the dynamic confidence threshold; and wherein the new value is determined to adjust the dynamic confidence by an amount proportional to a difference between the confidence parameter and the dynamic confidence threshold.

\* \* \* \* \*

UNITED STATES PATENT AND TRADEMARK OFFICE
CERTIFICATE OF CORRECTION

| | | |
|---|---|---|
| PATENT NO. | : 7,856,548 B1 | |
| APPLICATION NO. | : 11/645901 | |
| DATED | : December 21, 2010 | |
| INVENTOR(S) | : Chris Nelson et al. | |

It is certified that error appears in the above-identified patent and that said Letters Patent is hereby corrected as shown below:

Title Page under "Other Publications" on Page 2, Column 2, "Politcncnica" on the last line should read as --Politecnica--.

In Claim 1, Column 22 (line 35), "if" should be added after the word "complete.".

In Claim 1, Column 22 (line 55), "if" should be added after the word "complete.".

In Claim 8, Column 23 (line 22), "tall, in" should read as --comprises tallying--.

Signed and Sealed this
First Day of March, 2011

David J. Kappos
*Director of the United States Patent and Trademark Office*